United States Patent
Jachalsky et al.

(10) Patent No.: US 9,704,252 B2
(45) Date of Patent: Jul. 11, 2017

(54) METHOD AND APPARATUS FOR DISPARITY ESTIMATION

(71) Applicant: THOMSON LICENSING, Issy de Moulineaux (FR)

(72) Inventors: Joern Jachalsky, Wennigsen (DE); Uwe Janssen, Seelze (DE); Valter Drazic, Betton (FR)

(*) Notice: Subject to any disclaimer, the term of this patent is extended or adjusted under 35 U.S.C. 154(b) by 125 days.

(21) Appl. No.: 14/641,334

(22) Filed: Mar. 7, 2015

(65) Prior Publication Data

US 2015/0254864 A1   Sep. 10, 2015

(30) Foreign Application Priority Data

Mar. 7, 2014  (EP) .................................... 14305330

(51) Int. Cl.
*G06K 9/46* (2006.01)
*G06T 7/00* (2017.01)
(Continued)

(52) U.S. Cl.
CPC .............. *G06T 7/0075* (2013.01); *G06K 9/52* (2013.01); *G06K 9/6267* (2013.01); *G06T 7/593* (2017.01);
(Continued)

(58) Field of Classification Search
CPC . G06T 2207/20016; G06T 7/11; G06T 7/207; G06T 3/4053
(Continued)

(56) References Cited

U.S. PATENT DOCUMENTS 5,727,078 A * 3/1998 Chupeau .................. G06K 9/20
348/42
5,764,871 A * 6/1998 Fogel .................... G06T 7/0075
345/419
(Continued)

FOREIGN PATENT DOCUMENTS

WO   WO0027131        5/2000
WO   WO2011163603    12/2011

OTHER PUBLICATIONS

Brownrigg: "The weighted median filter", Commun. ACM, vol. 27, No. 8, pp. 807-818, Aug. 1984.
(Continued)

*Primary Examiner* — Yosef Kassa
(74) *Attorney, Agent, or Firm* — Tutunjian & Bitetto, P.C.

(57) ABSTRACT

A method for hierarchical disparity estimation on an image pair, wherein image pyramids are created by successively downscaling each image of the image pair, and an apparatus configured to perform the method are described. An initial disparity estimator applies a full search on a highest level of the image pyramids to determine initial disparity estimates, the highest level having the lowest resolution. A disparity propagator passes the initial disparity estimates to a next lower level of the image pyramids. An allocator then partitions the pixels of each remaining hierarchy level of the image pyramids into two or more groups of pixels, where each pixel in a group of pixels can be processed independently from remaining pixels of that group of pixels. A disparity estimator estimates disparity values for the pixels of a first group of pixels utilizing disparity estimates from a next higher level of the image pyramids. The disparity estimator further estimates disparity values for the pixels of remaining groups of pixels utilizing disparity estimates from
(Continued)

a previously processed group of pixels in that hierarchy level.

23 Claims, 4 Drawing Sheets

(51) Int. Cl.
    *G06K 9/52*     (2006.01)
    *G06K 9/62*     (2006.01)
    *G06T 7/593*     (2017.01)

(52) U.S. Cl.
    CPC ...... *G06T 7/97* (2017.01); *G06T 2207/20016* (2013.01)

(58) Field of Classification Search
    USPC .............. 382/190, 209, 218, 219, 278, 282; 358/537, 538, 453
    See application file for complete search history.

(56) References Cited

U.S. PATENT DOCUMENTS

| | | | | |
|---|---|---|---|---|
| 6,301,370 | B1* | 10/2001 | Steffens | G06K 9/00228 342/90 |
| 7,108,119 | B2* | 9/2006 | Blanchard | F16D 23/025 192/107 M |
| 7,260,274 | B2* | 8/2007 | Sawhney | G06T 3/40 348/47 |
| 7,711,181 | B2 | 5/2010 | Kee et al. | |
| 8,036,494 | B2* | 10/2011 | Chen | G06T 3/4053 382/298 |
| 8,160,370 | B2* | 4/2012 | Liu | G06T 7/207 348/169 |
| 8,175,412 | B2* | 5/2012 | Basri | G06K 9/34 382/100 |
| 8,379,014 | B2* | 2/2013 | Wiedemann | G06K 9/00201 345/419 |
| 8,385,630 | B2* | 2/2013 | Sizintsev | G06T 7/0022 348/42 |
| 8,406,512 | B2* | 3/2013 | Lin | G06T 7/0022 382/154 |
| 2011/0176722 | A1 | 7/2011 | Sizintsev et al. | |
| 2014/0063188 | A1 | 3/2014 | Smirnov et al. | |

OTHER PUBLICATIONS

Falkenhagen: "Hierarchical Block Based Disparity Estimation Considering Neighbourhood Constraints", Publication Date: Aug. 1, 1997; pp. 1-4.

Lee et al.: "Real-Time Disparity Estimation Algorithm for Stereo Camera Systems"; Publication Date: Aug. 1, 2011; Published in: IEEE Transactions on Consumer Electronics (vol. 57 , Issue: 3 ), pp. 1018-1026.

Ren et al.: "Learning a Classification Model for Segmentation"; Proceedings of the Ninth IEEE International Conference on Computer Vision; 2003 IEEE Publication Date: Oct. 13, 2003; pp. 1-8.

Scharstein et al: "A taxonomy and evaluation of dense two-frame stereo correspondence algorithms"; Int. J. Comput. Vision, vol. 47, No. 1, pp. 7-42, Apr. 2002.

Scharstein et al.: "High-accuracy stereo depth maps using structured light"; CVPR2003, vol. 1, pp. 195-202, Jun. 2003.

Song et al: "Implementation of real-time Laplacian pyramid image fusion processing based on FPGA", Proceedings of SPIE, vol. 6833, Nov. 6, 2007 (Nov. 6, 2007),pp. 683316-683316-8.

Tzovaras et al: "Evaluation of Multiresolution Block Matching Techniques for Motion and Disparity Estimation", Signal Processing. Image Communication, Elsevier Science Publishers, vol. 6, No. 1, Mar. 1994 (Mar. 1994), pp. 59-67.

Yoon et al.: "Adaptive support-weight approach for correspondence search"; Pattern Analysis and Machine Intelligence, IEEE Transactions on, vol. 28, No. 4, pp. 650-656, Apr. 2006.

Le et al.: "A New Coarse-To-Fine Method for Disparity Compuation by Sampling Disparity Space"; Publication Date: Oct. 21, 2008; Published in: Communications and Information Technologies, 2008. ISCIT 2008. IEEE International Symposium; pp. 87-94.

Search Report Dated Aug. 12, 2014.

* cited by examiner

METHOD AND APPARATUS FOR DISPARITY ESTIMATION

This application claims the benefit, under 35 U.S.C. §119 of European Patent Application No. 14305330.4, filed Mar. 7, 2014.

FIELD OF THE INVENTION

The invention relates to a method and an apparatus for disparity estimation. In particular, the invention relates to a method and an apparatus for hierarchical disparity estimation on an image pair.

BACKGROUND OF THE INVENTION

For the computation of depth information from a set of two (or even more) images, a matching process is applied to find point correspondences between input images. The displacement between two corresponding points is referred to as disparity. The 3D structure, i.e. the depth, of a scene can be reconstructed from these disparities. Often the performance of the matching process inherently depends on the underlying image content.

A good trade-off for an efficient matching processing needs to be found between the complete exploration of the full range of possible disparity values, which can lead to a significantly high number of candidates to be tested, and a too restrictive limitation of search candidates relying solely on the propagation of good results.

A disadvantages of a full search approach is the significantly high number of candidates to be tested. This results in a high processing load. Moreover, a full search can also lead to noisier disparity maps if, for example, the support window is too small. Despite these drawbacks a full search approach offers the maximum level of inherent parallelism.

On the other side of the spectrum, a too strict limitation of search candidates can lead to disparity maps lacking fine details. Moreover, the propagation of results within one image can significantly limit the inherent parallelism. In the extreme case, only a sequential processing is possible. Therefore, as mentioned above a good trade-off between the two approaches has to be found for a fast and efficient parallel processing approach.

SUMMARY OF THE INVENTION

It is an object of the present invention to propose an improved solution for disparity estimation on an image pair, which allows for parallel data accesses and data processing.

According to the invention, a method for hierarchical disparity estimation on an image pair, wherein image pyramids are created by successively downscaling each image of the image pair, comprises:
  applying a full search on a highest level of the image pyramids to determine initial disparity estimates, the highest level having the lowest resolution;
  passing the initial disparity estimates to a next lower level of the image pyramids;
  for each remaining hierarchy level of the image pyramids, partitioning the pixels of a hierarchy level into two or more groups of pixels, where each pixel in a group of pixels can be processed independently from remaining pixels of that group of pixels;
  for a first group of pixels, estimating disparity values for the pixels utilizing disparity estimates from a next higher level of the image pyramids; and
  for remaining groups of pixels, estimating disparity values for the pixels utilizing disparity estimates from a previously processed group of pixels in that hierarchy level.

Accordingly, an apparatus configured to perform hierarchical disparity estimation on an image pair, wherein image pyramids are created by successively downscaling each image of the image pair, comprises:
  an initial disparity estimator configured to apply a full search on a highest level of the image pyramids to determine initial disparity estimates, the highest level having the lowest resolution;
  a disparity propagator configured to pass the initial disparity estimates to a next lower level of the image pyramids;
  an allocator configured to partition the pixels of each remaining hierarchy level of the image pyramids into two or more groups of pixels, where each pixel in a group of pixels can be processed independently from remaining pixels of that group of pixels; and
  a disparity estimator configured to estimate disparity values for the pixels of a first group of pixels utilizing disparity estimates from a next higher level of the image pyramids and to estimate disparity values for the pixels of remaining groups of pixels utilizing disparity estimates from a previously processed group of pixels in that hierarchy level.

Also, a non-transitory computer readable storage medium has stored therein instructions enabling hierarchical disparity estimation on an image pair, wherein image pyramids are created by successively downscaling each image of the image pair, which when executed by a computer, cause the computer to:
  apply a full search on a highest level of the image pyramids to determine initial disparity estimates, the highest level having the lowest resolution;
  pass the initial disparity estimates to a next lower level of the image pyramids;
  for each remaining hierarchy level of the image pyramids, partition the pixels of a hierarchy level into two or more groups of pixels, where each pixel in a group of pixels can be processed independently from remaining pixels of that group of pixels;
  for a first group of pixels, estimate disparity values for the pixels utilizing disparity estimates from a next higher level of the image pyramids; and
  for remaining groups of pixels, estimate disparity values for the pixels utilizing disparity estimates from a previously processed group of pixels in that hierarchy level.

The proposed solution splits the hierarchical disparity estimation approach into several steps that allow for parallel data accesses and data processing. The proposed solution has a variety of advantages. Due to the hierarchical approach the processing load is reduced. In addition, the parallel processing and data access scheme allows for an efficient GPU-implementation.

In one embodiment the pixels of a hierarchy level are partitioned into four groups of pixels in accordance with row numbers and column numbers of the pixels. The first group of pixels comprises only pixels with an even row number and an even column number, a second group of pixels comprises only pixels with an odd row number and an odd column number, a third group of pixels comprises only pixels with an even row number and an odd column number, and a fourth group of pixels comprises only pixels with an odd row number and an even column number. The resulting special access patterns allow efficiently propagating information from the spatial neighborhood.

In one embodiment a weighted median is applied on the disparity values estimated for the pixels of a hierarchy level. The weighted median is an edge-preserving smoothing filter that helps to reduce potential noise in the disparity values and further helps to better align the disparity estimates to object edges. This is especially interesting if the cost function for the disparity estimation does not utilize locally adaptive support weights.

In one embodiment each image of the image pair is downscaled by factor 2 in both dimensions between successive levels. It may likewise be scaled in only one dimension. The downscaling factor of 2 in general eases the implementation of the downscaling filter and thereby also reduces the required processing costs for the downscaling. Moreover, it also simplifies the pixel position calculation between the hierarchy levels.

In one embodiment disparity estimates of a next higher level determine a search interval for the disparity estimation in a current level. For example, the search interval for the disparity estimation in the current level is defined by minimum and maximum disparity estimates of the next higher level.

In one embodiment the width of the search interval for the disparity estimation in the current level can be increased by an offset using an adder. The intention of this offset is to avoid a too restrictive limitation of the search interval. Such a search range determination allows better handling of regions with disparity discontinuity.

In one embodiment a search window is scaled in correspondence with the levels of the image pyramid. This scaling of the search windows is done to have the same spatial neighborhood throughout the scaled hierarchy levels for the disparity estimation.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
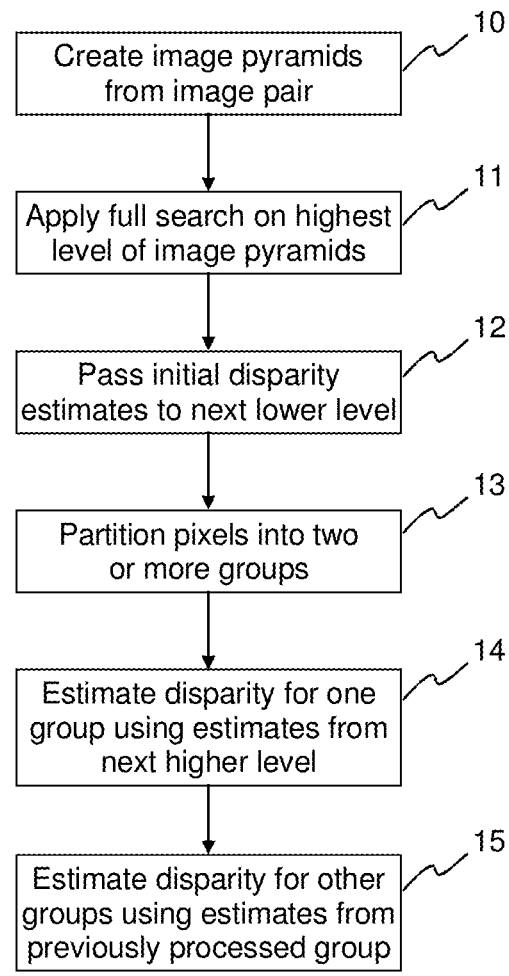
FIG. 1 schematically illustrates a method according to the invention.

A method according to one embodiment of the invention for hierarchical disparity estimation on an image pair, wherein image pyramids are created 10 by successively downscaling each image of the image pair, is schematically shown in FIG. 1. In a first step a full search is applied 11 on a highest level of the image pyramids to determine initial disparity estimates. The initial disparity estimates are then passed 12 to a next lower level of the image pyramids. For each remaining hierarchy level of the image pyramids, the pixels of a hierarchy level are partitioned 13 into two or more groups of pixels, where each pixel in a group of pixels can be processed independently from remaining pixels of that group of pixels. Finally, for a first group of pixels, disparity values are estimated 14 for the pixels utilizing disparity estimates from a next higher level of the image pyramids. For remaining groups of pixels, disparity values are estimated 15 for the pixels utilizing disparity estimates from a previously processed group of pixels in that hierarchy level.

Figure 2:
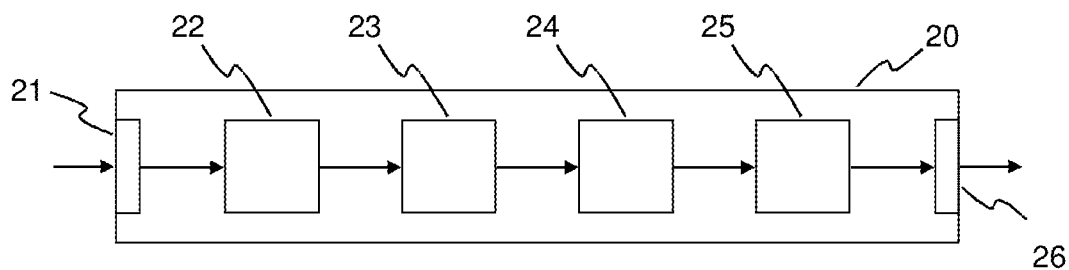
FIG. 2 schematically illustrates an apparatus configured to perform a method according to the invention.

FIG. 2 schematically illustrates one embodiment of an apparatus 20 adapted to implement a method according to the invention for hierarchical disparity estimation on an image pair. The apparatus has an input 21 for retrieving an image pair on which hierarchical disparity estimation is to be performed. The image pair may likewise be obtained from an internal storage of the apparatus 20. An initial disparity estimator 22 applies 11 a full search on a highest level of the image pyramids to determine initial disparity estimates. A disparity propagator 23 passes 12 the initial disparity estimates to a next lower level of the image pyramids. An allocator 24 then partitions 13 the pixels of each remaining hierarchy level of the image pyramids into two or more groups of pixels, where each pixel in a group of pixels can be processed independently from remaining pixels of that group of pixels. A disparity estimator 25 estimates 14 disparity values for the pixels of a first group of pixels utilizing disparity estimates from a next higher level of the image pyramids. The disparity estimator 25 further estimates 15 disparity values for the pixels of remaining groups of pixels utilizing disparity estimates from a previously processed group of pixels in that hierarchy level. The disparity estimates are made available at an output 26. The various units 22, 23, 24, 25 of the apparatus 20 may likewise be fully or partially combined or implemented as software running on a processor. Also, the input 21 and the output 26 may be combined into a single bidirectional interface.

In the following the proposed solution for hierarchical disparity estimation on an image pair shall be described in more detail for the case of four groups containing even pixels, odd pixels, or pixels located horizontally between even or odd pixels. The solution may likewise be adapted to less then four groups. Initially, for each view a so called image pyramid is compiled. The image pyramid is created in such a way that the original image of the view is successively downscaled. Each downscaling creates a new and smaller layer. The number of layers L can be selected and is to some extent dependent on the resolution of the original images. Here, the following naming convention is used: The lowest layer 0 is the original image, and the highest layer L−1 is the smallest image within the image pyramid. In the present example the size of the downscaled image of layer i+1 is half in the horizontal dimension and half in the vertical dimension compared to the image of the next lower layer i.

At the beginning of the hierarchical disparity estimation, the highest layer L−1 is processed. It is handled in a special way. For example, a full search is applied on the highest layer L−1 to initialize the hierarchical disparity estimation. The estimated disparity values are then passed to the next lower level L−2.

Figure 3:
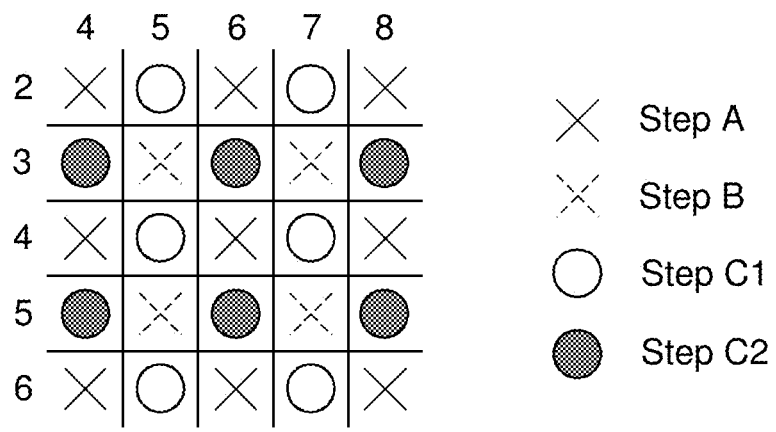
FIG. 3 illustrates which pixels are contained in specific groups.

For each of the remaining hierarchy levels from L−2 to 0 the following steps are performed, which will be explained in more detail below:

Step A: Process even pixels only
Step B: Process odd pixels only
Step C1: Process pixels between even pixels (horizontally)
Step C2: Process pixels between odd pixels (horizontally)
Step D (optional): Apply weighted median Which pixels are used in the above processing steps is illustrated in FIG. 3.

Step A, the estimation of the disparity values for the even pixels in the reference frame, i.e. pixels with even rows and even columns, uses the estimated disparity values of the next higher hierarchy level i+1. With these as an input, the disparity values of the even pixels are estimated for the current hierarchy level i.

The code fragment below illustrates the determination of the search range for the disparity estimation. For the sake of clarity, border handling and disparity range clipping are omitted in all code fragments.

```
row = img_row / 2 # img_row: even row in current hierarchy i
col = img_col / 2 # im_col: even column in current hierarchy i
# disp_in: disparity values of the next higher hierarchy level
  i+1
NW = 2 * disp_in[row − 1, col − 1]
NE = 2 * disp_in[row − 1, col + 1]
SW = 2 * disp_in[row + 1, col − 1]
SE = 2 * disp_in[row + 1, col + 1]
d_max = max(NW, max(NE, max(SW, SE)))
d_min = min(NW, min(NE, min(SW, SE)))
# Optionally:
d_max = d_max + offset_A
d_min = d_min − offset_A
```

A determining unit uses d_max and d_min to define the search interval [d_min,d_max] for the disparity estimation at the position (img_row, img_col) in the reference image. All the disparity values in this closed interval are evaluated and the best match is selected.

As seen in the code fragment above, Step A is used to scale the disparity values from the next higher level i+1 to the value range of the current level i. Thus, it transfers the disparity estimates from level i+1 into the domain of level i.

Step B, the estimation of the disparity values for the odd pixels in the reference frame, i.e. pixels with odd rows and odd columns, uses the disparity values estimated in Step A to determine the search range. The code fragment below illustrates this:

```
# img_row: odd row in current hierarchy i
# img_col: odd col in current hierarchy i
# disp: disparity values containing the results from Step A
NE = disp[img_row − 1, img_col + 1]
SW = disp[img_row + 1, img_col − 1]
NW = disp[img_row − 1, img_col − 1]
SE = disp[img_row + 1, img_col + 1]
d_max = max(NW, max(NE, max(SW, SE)))
d_min = min(NW, min(NE, min(SW, SE)))
# Optionally:
d_max = d_max + offset_B
d_min = d_min − offset_B
```

Again d_max and d_min define the search interval [d_min,d_max] for the disparity estimation at the position (img_row, img_col) in the reference image. All the disparity values in this closed interval are evaluated and the best match is selected.

Step C1, the estimation of the disparity values for the pixels between the even pixels (horizontally), i.e. pixels with even rows and odd columns in the reference frame, uses the disparity values estimated in Step A. The code fragment below illustrates this:

```
# img_row: even row in current hierarchy i
# img_col: odd col in current hierarchy i
W = disparity[img_row, img_col − 1]
E = disparity[img_row, img_col + 1]
```

The search intervals are [W−offset_C1, W+offset_C1] and [E−offset_C1, E+offset C1]. As an option the following two additional search intervals can be added. They are determined in the following way:

N=disparity[img_row, img_col−1]
S=disparity[img_row, img_col+1]

The additional search intervals are then [N−offset_C1, N+offset_C1] and [S−offset_C1, S+offset_C1]. It should be noted that this option requires the results from Step B.

It is also possible to use a similar approach for the determination of the search interval as described for Step A and Step B, but this can lead to an increase of the number of candidates to be checked.

d_max=max(N, max(S, max(W, E)))
d_min=min(N, min(S, min(W, E)))

Step C2, the estimation of the disparity values for the pixels between the odd pixels (horizontally), i.e. pixels with odd rows and even columns in the reference image, uses the disparity values estimated in Step B:

img_row: odd row in current hierarchy
img_col: even col in current hierarchy
W=disparity[img_row, img_col−1]
E=disparity[img_row, img_col+1]

The search intervals are [W−offset_C2, W+offset_C2] and [E−offset_C2, E+offset_C2]. Of course, the options described above for Step C1 can likewise be applied to Step C2.

Step C1 and Step C2 can run in parallel. Moreover, if the option to add search ranges (north and south) for Step C1 and Step C2 is not used, Step B, Step C1,and Step C2 can run in parallel.

Following Step C2 optionally a weighted median is applied on the disparity values estimated for the hierarchy level i by a weighting unit.

The search or support window can be scaled in correspondence with the image pyramid. Thus, a possible configuration is to use the unscaled support window size on the lowest level (0) and to downscale the support window size with each higher level. One possible configuration for a four layer image pyramid would be:

Level 0: 32×32 support window
Level 1: 16×16 support window
Level 2: 8×8 support window
Level 3: 4×4 support window In the following the performance of the proposed solution shall be demonstrated with reference to FIGS. 4 to 7 for the cones data set described in D. Scharstein et al.: "High-accuracy stereo depth maps using structured light", Proceedings of the IEEE Conference on Computer Vision and Pattern Recognition (2003), pp. 195-202. No post-processing was applied, i.e. no occlusion filling etc.

Figure 4:
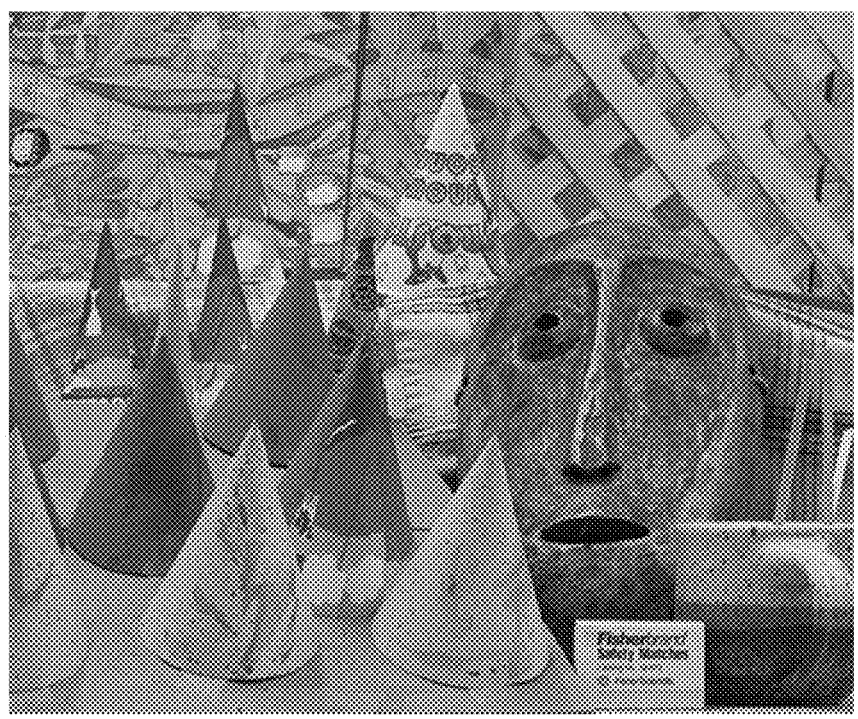
FIG. 4 depicts an original image used for demonstrating the performance of the proposed solution.
Figure 5:
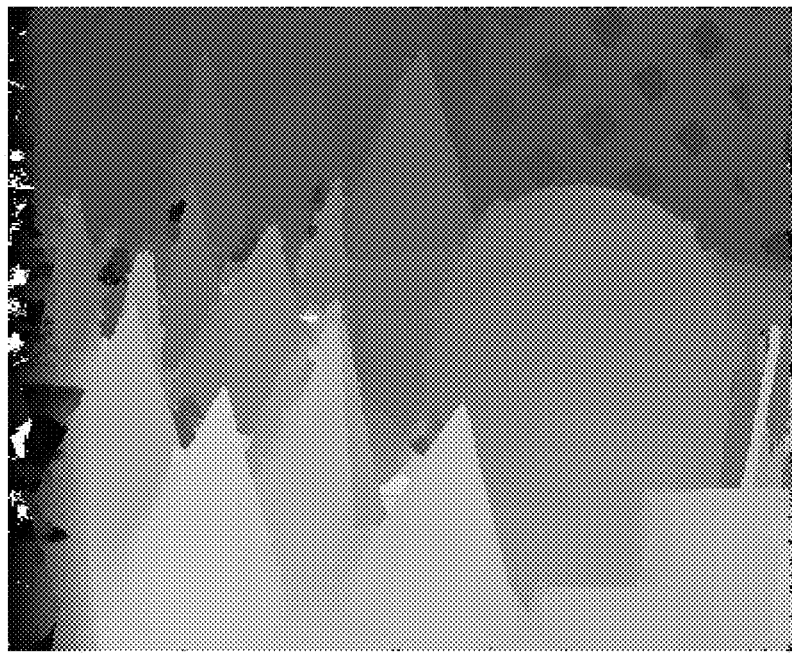
FIG. 5 shows a disparity map obtained with the proposed solution.
Figure 6:
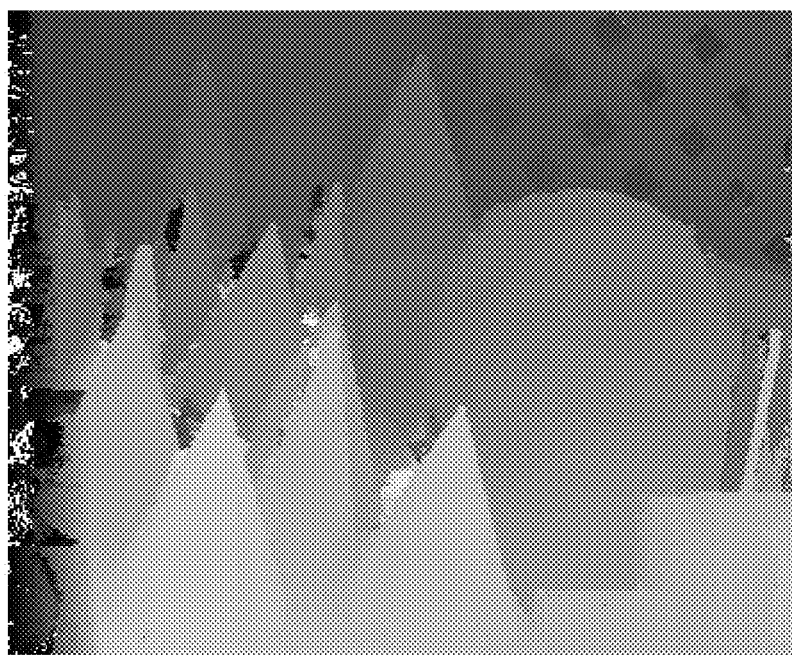
FIG. 6 depicts a disparity map obtained with the proposed solution without application of a weighted median.
Figure 7:
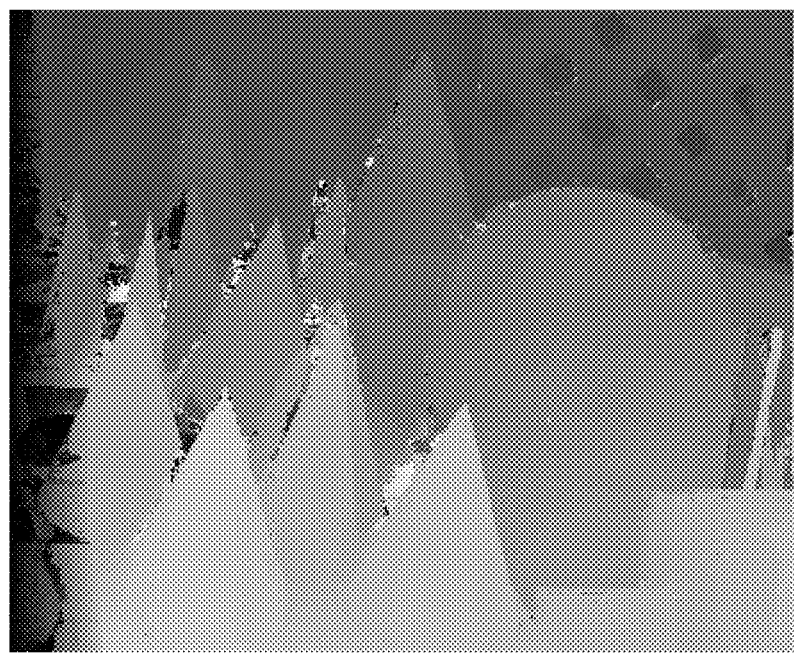
FIG. 7 illustrates results obtained with a plain full-search approach.

In particular, FIG. 4 depicts the original image (left view) of the cone data set. FIG. 5 shows a disparity map obtained with the proposed solution. FIG. 6 depicts a disparity map obtained with the proposed solution without application of a weighted median.

As a reference, results for a plain full-search approach are depicted in FIG. 7, again without any post-processing.

As a cost function an adaptive support weight approach was chosen for both the full-search approach and the proposed solution. For the sake of simplicity the displayed disparity maps were cropped to omit the border region.

With the proposed solution a significant speedup compared to the full-search approach can be achieved without degrading the quality. In addition, an advantage of the propagation of the results becomes apparent from FIG. 5 and FIG. 6. Both, the version with or without application of a weighted median generate disparity maps with less noise compared to the full-search approach. Moreover, their resulting disparity maps are smoother.

The invention claimed is:

1. A method for hierarchical disparity estimation on an image pair, wherein image pyramids are created by successively downscaling each image of the image pair, the method comprising:
   applying a full search on a highest level of the image pyramids to determine initial disparity estimates;
   passing the initial disparity estimates to a next lower level of the image pyramids, the highest level having the lowest resolution;
   for each remaining hierarchy level of the image pyramids, partitioning the pixels of a hierarchy level into two or more groups of pixels, where each pixel in a group of pixels can be processed independently from remaining pixels of that group of pixels;
   for a first group of pixels, estimating disparity values for the pixels utilizing disparity estimates from a next higher level of the image pyramids; and
   for remaining groups of pixels, estimating disparity values for the pixels utilizing disparity estimates from a previously processed group of pixels in that hierarchy level.

2. The method according to claim 1, wherein the pixels of a hierarchy level are partitioned into four groups of pixels in accordance with row numbers and column numbers of the pixels.

3. The method according to claim 2, wherein the first group of pixels comprises only pixels with an even row number and an even column number, a second group of pixels comprises only pixels with an odd row number and an odd column number, a third group of pixels comprises only pixels with an even row number and an odd column number, and a fourth group of pixels comprises only pixels with an odd row number and an even column number.

4. The method according to claim 1, wherein a weighted median is applied on the disparity values estimated for the pixels of a hierarchy level.

5. The method according to claim 1, wherein each image of the image pair is downscaled by factor 2 in both dimensions between successive levels.

6. The method according to claim 1, wherein disparity estimates of a next higher level determine a search interval for the disparity estimation in a current level.

7. The method according to claim 6, wherein the search interval for the disparity estimation in the current level is defined by minimum and maximum disparity estimates of the next higher level.

8. The method according to claim 7, wherein an offset is added to the search interval for the disparity estimation in the current level.

9. The method according to claim 1, wherein a search window is scaled in correspondence with the levels of the image pyramid.

10. An apparatus configured to perform hierarchical disparity estimation on an image pair, wherein image pyramids are created by successively downscaling each image of the image pair, the apparatus comprising:
    an initial disparity estimator configured to apply a full search on a highest level of the image pyramids to determine initial disparity estimates, the highest level having the lowest resolution;
    a disparity propagator configured to pass the initial disparity estimates to a next lower level of the image pyramids;
    an allocator configured to partition the pixels of each remaining hierarchy level of the image pyramids into two or more groups of pixels, where each pixel in a group of pixels can be processed independently from remaining pixels of that group of pixels; and
    a disparity estimator configured to estimate disparity values for the pixels of a first group of pixels utilizing disparity estimates from a next higher level of the image pyramids and to estimate disparity values for the pixels of remaining groups of pixels utilizing disparity estimates from a previously processed group of pixels in that hierarchy level.

11. The apparatus according to claim 10, wherein the allocator partitions the pixels of a hierarchy level into four groups of pixels in accordance with row numbers and column numbers of the pixels.

12. The apparatus according to claim 10, comprising a weighting unit configured to apply a weighted median on the disparity values estimated for the pixels of a hierarchy level.

13. The apparatus according to claim 10, comprising a determining unit configured to determine a search interval for the disparity estimation in a current level based on disparity estimates of a next higher level.

14. The apparatus according to claim 13, comprising an adder to add an offset to the search interval for the disparity estimation in the current level.

15. A non-transitory computer readable storage medium having stored therein instructions enabling hierarchical disparity estimation on an image pair, wherein image pyramids are created by successively downscaling each image of the image pair, which when executed by a computer, cause the computer to:
    apply a full search on a highest level of the image pyramids to determine initial disparity estimates, the highest level having the lowest resolution;
    pass the initial disparity estimates to a next lower level of the image pyramids;
    for each remaining hierarchy level of the image pyramids, partition the pixels of a hierarchy level into two or more groups of pixels, where each pixel in a group of pixels can be processed independently from remaining pixels of that group of pixels;
    for a first group of pixels, estimate disparity values for the pixels utilizing disparity estimates from a next higher level of the image pyramids; and
    for remaining groups of pixels, estimate disparity values for the pixels utilizing disparity estimates from a previously processed group of pixels in that hierarchy level.

16. The non-transitory computer readable storage medium according to claim 15, wherein the instructions cause the computer to partition the pixels of a hierarchy level into four groups of pixels in accordance with row numbers and column numbers of the pixels.

17. The non-transitory computer readable storage medium according to claim 16, wherein the first group of pixels comprises only pixels with an even row number and an even column number, a second group of pixels comprises only pixels with an odd row number and an odd column number, a third group of pixels comprises only pixels with an even row number and an odd column number, and a fourth group of pixels comprises only pixels with an odd row number and an even column number.

18. The non-transitory computer readable storage medium according to claim 15, wherein the instructions cause the computer to apply a weighted median on the disparity values estimated for the pixels of a hierarchy level.

19. The non-transitory computer readable storage medium according to claim 15, wherein the instructions cause the computer to downscale each image of the image pair by factor 2 in both dimensions between successive levels.

20. The non-transitory computer readable storage medium according to claim 15, wherein disparity estimates of a next higher level determine a search interval for the disparity estimation in a current level.

21. The non-transitory computer readable storage medium according to claim 20, wherein the search interval for the disparity estimation in the current level is defined by minimum and maximum disparity estimates of the next higher level.

22. The non-transitory computer readable storage medium according to claim 21, wherein the instructions cause the computer to add an offset to the search interval for the disparity estimation in the current level.

23. The non-transitory computer readable storage medium according to claim 15, wherein the instructions cause the computer to scale a search window in correspondence with the levels of the image pyramid.

\* \* \* \* \*